United States Patent [19]
Angeski

[11] 3,881,553
[45] May 6, 1975

[54] LAWN AERATING AND DRESSING MEANS
[75] Inventor: Joseph P. Angeski, Monroeville, Pa.
[73] Assignee: A. I. Co., Altoona, Pa.
[22] Filed: Apr. 30, 1973
[21] Appl. No.: 355,549

[52] U.S. Cl............................ 172/22; 172/554
[51] Int. Cl............................................ A01b 45/02
[58] Field of Search....... 172/21, 22, 540, 554, 611; 111/99

[56] References Cited
UNITED STATES PATENTS

| | | | |
|---|---|---|---|
| 563,514 | 7/1896 | Spalding et al. | 172/611 X |
| 2,700,926 | 2/1955 | Goit | 172/22 |
| 3,022,833 | 2/1962 | Reaser | 172/22 X |
| 3,171,498 | 3/1965 | Logan | 172/22 |
| 3,650,332 | 3/1972 | Dedoes | 172/22 |

FOREIGN PATENTS OR APPLICATIONS

| | | | |
|---|---|---|---|
| 703,171 | 1/1954 | United Kingdom | 172/22 |
| 609,503 | 2/1935 | Germany | 172/22 |
| 66,136 | 7/1950 | Netherlands | 172/540 |

*Primary Examiner*—Edgar S. Burr
*Assistant Examiner*—Paul T. Sewell
*Attorney, Agent, or Firm*—Smith, Harding, Earley & Follmer

[57] ABSTRACT

Means for aerating and dressing lawns in a single operation including a cage member supported on a handle and having a plurality of pluggers projecting therefrom. As the pluggers are forced into and pulled out of the lawn, plugs of earth are forced into the interior of cage member and broken up therein. The cage member is provided with openings to allow the broken pieces of earth to be scattered onto the lawn as a form of top dressing as the plugging operation is carried out throughout the surface of the lawn.

9 Claims, 9 Drawing Figures

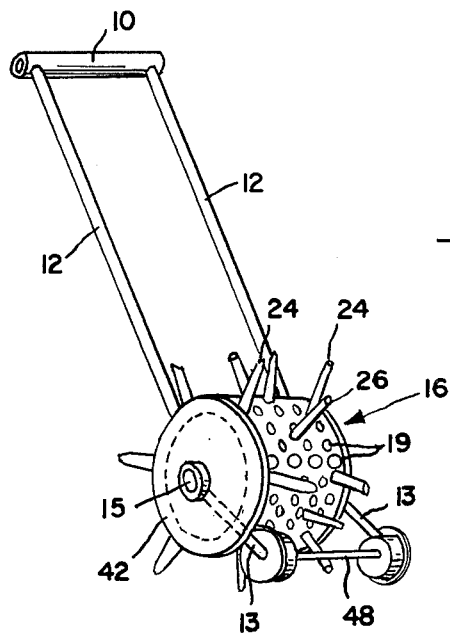
FIG. 1.
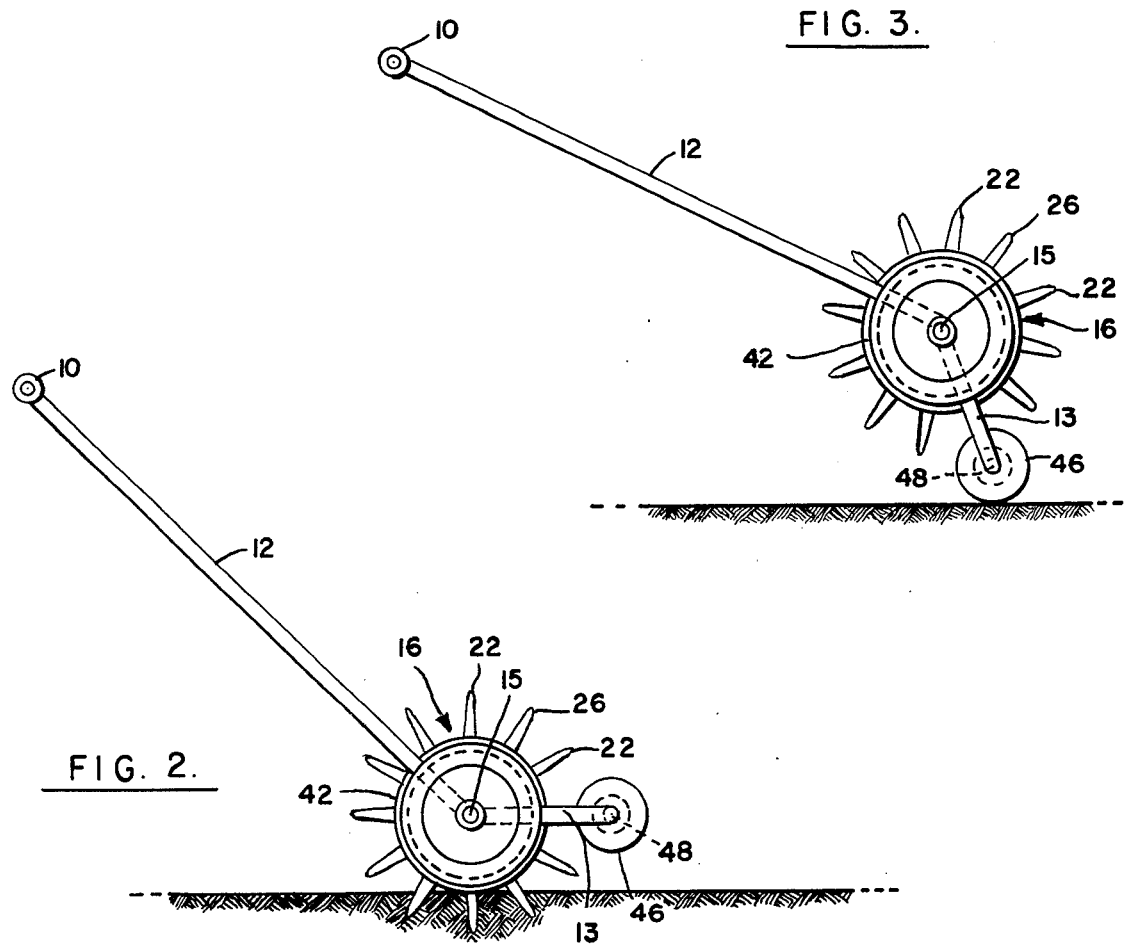
FIG. 3.
FIG. 2.

LAWN AERATING AND DRESSING MEANS

BACKGROUND OF THE INVENTION

This invention relates to apparatus for the aerating and top dressing of lawns.

While there have been provided devices for aerating lawns by cutting out plugs of earth and depositing them on the lawn, these devices operate in a manner such that it is necessary to break the plugs and scatter them by means other than the plug removing apparatus before the removed plugs can become useful as a form of top dressing for the lawn. Moreover, these devices are constructed primarily for use on large lawn areas such as golf courses and are bulky and expensive.

SUMMARY OF THE INVENTION

It is the general object of this invention to provide a means for aerating and top dressing a lawn in a single operation. It is a further object to provide such a means which is light in construction, inexpensive and easy to operate so that it is available for use by the average home owner.

Briefly stated the aerating and top dressing means in accordance with the invention is provided with means for receiving plugs of earth removed from the lawn, such means having a plurality of pluggers projecting therefrom so that as the pluggers are forced into and pulled out of the lawn repeatedly, plugs of earth will be forced into the interior of the plug receiving means whereat they are broken up. The plug receiving means is provided with openings therein to allow the broken pieces of earth to fall therefrom onto the lawn as the plugging operation progresses so as to provide a top dressing for the lawn.

BRIEF DESCRIPTION OF THE DRAWINGS

FIG. 1 is a perspective view of a lawn aerating and dressing means in accordance with the invention;

FIG. 2 is a side elevation of the means shown in FIG. 1;

FIG. 3 is a view similar to FIG. 2 with the lawn aerating and dressing means in an alternate position;

DETAILED DESCRIPTION OF THE INVENTION

Figure 4:
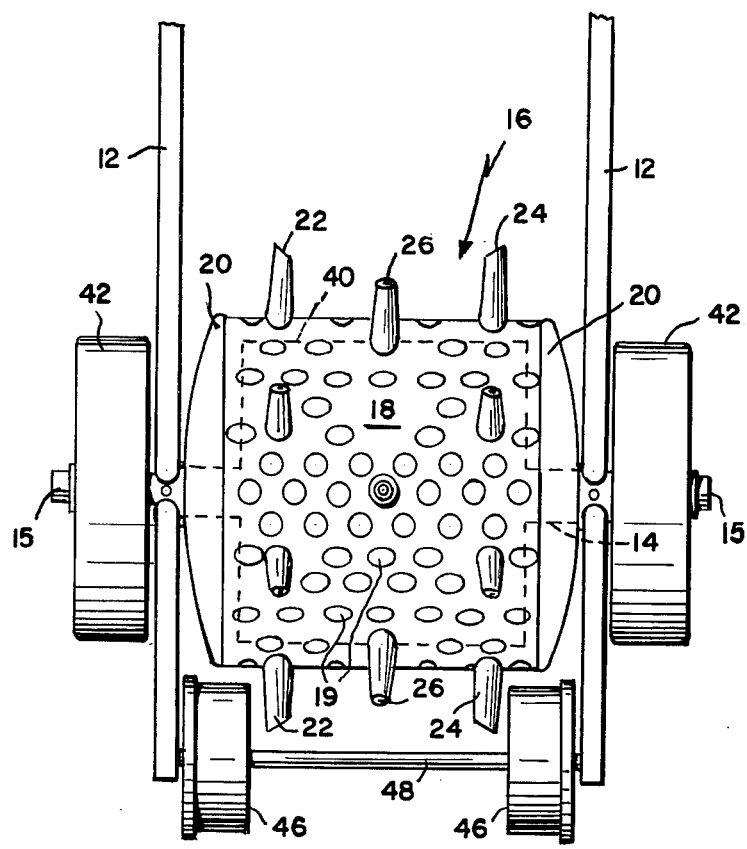
FIG. 4 is a plan view of the means shown in FIG. 2.

One embodiment of the invention is shown in FIGS. 1 to 5 and comprises a handle means including a handle grip member 10 and a pair of elongated handle extensions 12 which are connected to an axle 14 by suitable means such as pins. Axle 14 extends transversely between handle extensions 12 and has mounted thereon a plug receiving means in the form of a screen cage 16. Screen cage 16 comprises a hollow cylindrical screen portion 18 provided with a plurality of screen-like openings 19 throughout the surface thereof. Screen portion 18 is enclosed at its ends by a pair of end plates 20 which are constructed to provide a substantial amount of weight for a purpose to be described hereafter.

Mounted on screen portion 18 are a plurality of pluggers or coring elements arranged in three spaced rows. The pluggers on the outer rows are indicated at 22 and 24 and the pluggers of the middle row are indicated at 26. The pluggers 22, 24 and 26 are arranged in a staggered relation and are circumferentially spaced around the screen portion 18 as is best shown in FIG. 4. Each of the pluggers consists of a tubular element extending radially outwardly from screen portion 18 and being tapered to converge from a large diameter portion at the region of the screen 18 to a smaller diameter orifice at the outer end thereof. This tapered configuration prevents clogging of the pluggers during operation. The pluggers 22 and 24 in the outer rows are truncated angularly at their ends as is shown in FIG. 4 to form a spike-like configuration whereas the pluggers 26 in the middle row are formed with a squared-off end. This construction serves to equalize the depth of penetration since the middle row of pluggers 26 will tend to penetrate more deeply because the entire weight of the aerator acts on this plugger alone while two of the outer pluggers will always be utilized to support the weight of the aerator.

Figure 5:
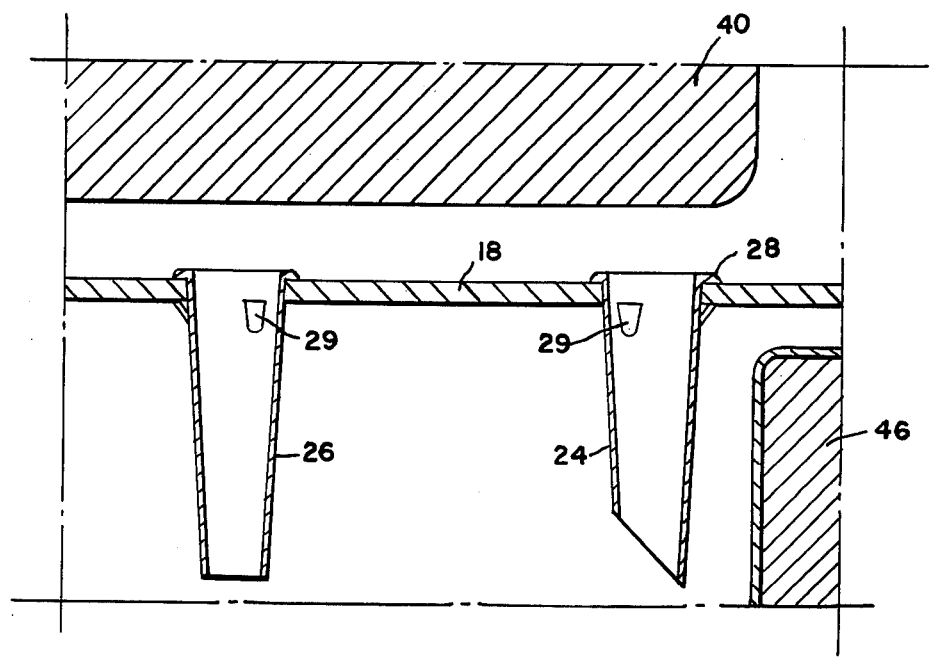
FIG. 5 is a fragmentary sectional view illustrating a detail.
Figure 8:
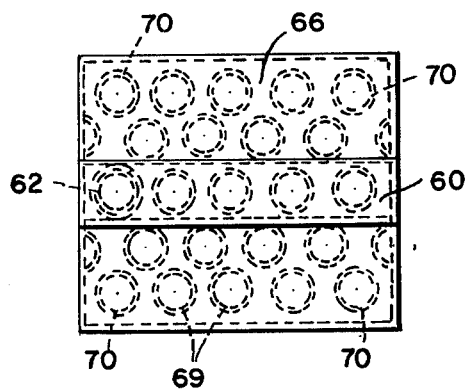
FIG. 8 is a top view of the embodiment shown in FIG. 6.

The pluggers 22, 24 and 26 are mounted on the screen portion 18 without the necessity of using bolts or welding. Referring to FIG. 5 the inner ends of the pluggers are flared outwardly to form an annular rim 28 after the pluggers are inserted into the receiving opening in the screen portion 18. This annular rim 28 prevents outward movement of the pluggers by reason of the contact with the inner side of the screen portion 18. Previously formed punched out tabs 29 are arranged to engage the outer side of the screen portion 18 to prevent inward movement of the pluggers.

A cylindrical weight 40 is fixedly mounted on axle 14 within the screen portion 18. The weight 40 is constructed and arranged so that its periphery is located adjacent the inner ends of the pluggers 22, 24 and 26 and is spaced therefrom an amount less than the length of the pluggers. By this arrangement the weight 40 serves as a means for breaking up the plugs of earth as they are forced into the interior of the screen portion 18 through the pluggers 22, 24 and 26.

As was discussed above, end plates 20 have a substantial weight. More specifically, these end plates 20 are desirably made heavy enough to represent approximately forty percent of weight necessary to force the pluggers 22, 24 and 26 into the ground under average conditions, the weight 40 providing most of the remaining weight of the aerator. Since these end plates 20 rotate with the screen portion 18 as the aerator is moved along the ground, an inertia effect is achieved whereby the aerator can be pushed with less effort.

The axle 14 is provided with extended end portions 15 which extend outwardly beyond the point of connection of the axle with the handle extensions 12. A pair of auxiliary weights 42 are removably mounted on these extended end portions 15 by use of pins or the like. Accordingly, the auxiliary weights 42 can be added to or taken off the aerator to adjust the same to the hardness of the soil and to the desired depth of plug penetration. Also, in aerating a slope or bank, one of the auxiliary weights can be taken off in order to balance the aerator and equalize the depth of penetration on the outer pluggers 22 and 24.

The handle extensions 12 each have a portion 13 extending from the location where the axle 14 is connected thereto. Each portion 13 extends at an obtuse angle (approximately 120°) to the portion of the associated handle extension 12 between the grip portion 10 and the axle connection point. This angle is illustrated best in FIG. 2. Mounted on these extended portions 13 of the handle is a wheel means comprising a pair of wheels 46 mounted on a shaft 48 rotatably carried at the ends of these extended portions 13. By reason of this construction, the aerator may be moved along a lawn in either the position shown in FIG. 2 or in the turned over position shown in FIG. 3. In the position shown in FIG. 2, the aerator can be moved along a lawn with the screen portion 18 in contact with the surface thereof and the wheels 48 held above the lawn. In the position shown in FIG. 3, the aerator is moved along a lawn with the wheels 46 in contact therewith and with the pluggers 22, 24 and 26 and the screen portion 18 held out of contact therewith. By reason of this arrangement an operator can move the aerator across a lawn with complete flexibility as to whether or not plugs are to be removed therefrom.

In order to perform an aerating and top dressing operation on a lawn, the aerator is pulled or punched along the lawn by means of the handle means in the FIG. 2 position. During this movement, the screen portion 18 rolls along the surface of the lawn with the pluggers 22, 24 and 26 being forced into and out of the ground repeatedly. During this movement the weight 40 and the auxiliary weights 42 serve to provide sufficient weight to insure the penetration by the pluggers 22, 24 and 26. Also during this movement plugs of earth which are approximately the length of a plugger are cut from the lawn. As each new plug of earth enters a previously filled plugger, this new plug will force the last plug through the plugger causing it to impinge against the weight 40 whereby it breaks into small lumps of earth. Eventually the small broken pieces of earth will pass through the screen openings 19 in the screen portion 18 and are scattered onto the lawn as a form of top dressing. It will be apparent that by this mode of operation both the aerating and the top dressing of the lawn in achieved in a single operation. Also, the force required to move the aerator across the lawn is reduced by the inertia effect of the rotating end plates 20.

The aerators in accordance with the invention will thus provide a tool for the average home owner to aerate, with little effort, any lawn or garden area desired, regardless of size or accessibility. The non-clogging pluggers prevent excessive tearing of the lawn by cutting small sharp plugs of earth which are temporarily retained in the screened plug receiving means and then scattered throughout the lawn as a form of top dressing. Moreover, all this is done in a single operation.

Another embodiment of the invention is shown in FIGS. 6 to 9 and comprises a handle means comprising a handle grip member 60 and an elongated handle extension 62. The lower end of the handle extension 62 is secured, as by welding, to a plug receiving means which comprises a screen cage 64 and a step cap 66 secured together to define a rectangular-shaped plug receiving chamber 68 therein. The screen cage 64 is provided with screen-like openings 69 which are located along the bottom and sides of the plug receiving means as is apparent from FIGS. 6 to 9.

Mounted on the bottom side of the screen are four pluggers 70, or coring elements, located at the corners thereof. Each of the pluggers 70 is comprised of a tubular element provided with a reduced diameter portion at the lower end to define the orifice through which the plugs enter the plugger, this orifice being smaller than the main body portion of the plugger so as to avoid clogging of the plugger during operation.

Figure 7:
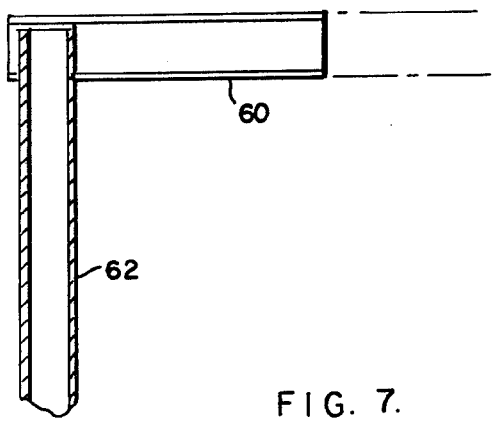
FIG. 7 is a sectional view of the embodiment shown in FIG. 6.
Figure 9:
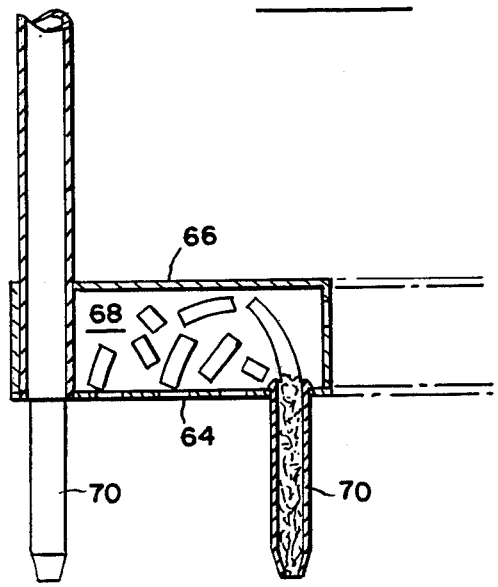
FIG. 9 is a fragmentary side elevation of the embodiment shown in FIG. 6.
Figure 9:
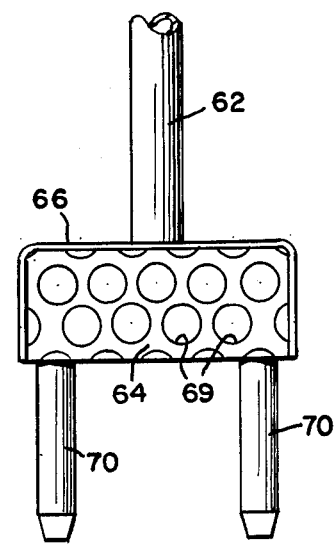

The plug receiving means is constructed so that the top wall of the step cap 66 is spaced above the pluggers 70 an amount less than the length of the pluggers. Accordingly, as each new plug of earth is forced into a plugger 70 it will force the last plug upward through the plugger 70 causing it to break into small lumps as it hits the top wall of the step plate, as is illustrated in FIG. 7.

In the operation of the aerator shown in FIGS. 6 to 9, the operator manually presses the aerator into the ground by stepping onto the step cap 66 after which he pulls the aerator upwardly out of the ground and reinserts it at an adjacent location. These steps are repeated across the surface of the lawn to be aerated. As this procedure is performed, the plugs of earth will be forced into the plug receiving chamber 68 and broken up therein as described above. Subsequently the broken pieces of earth will be scattered onto the lawn as a form of top dressing by falling through the openings 69 in the screen cage 64.

Figure 6:
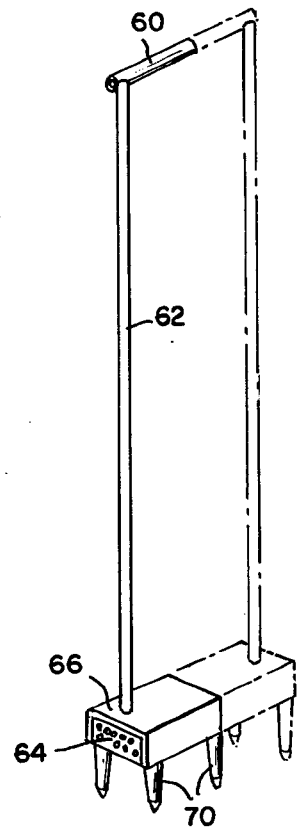
FIG. 6 is a perspective view of another embodiment of the invention.

The aerator shown in FIGS. 6 to 9 optionally may be provided with an extension as shown in dashed lines in FIG. 6. This extension increases the capacity of the aerator.

It will be evident that various changes may be made in the construction and arrangement of parts without departing from the scope of the invention.

I claim:

1. Means for the aerating and top dressing of a lawn in a single operation comprising means for receiving plugs of earth from the lawn, a plurality of pluggers mounted on and projecting from said plug receiving means for penetrating into the lawn surface and removing a plug of earth therefrom, said pluggers having a tubular construction for delivering removed plugs through the inner ends thereof to said plug receiving means and breaking means including a surface provided adjacent the inner end of each plugger, extending perpendicular to the axis of each plugger across the inner ends thereof and spaced therefrom a distance less than the length of a removed plug so as to be impinged upon by such plugs for causing plugs entering said plug receiving means from said pluggers to be broken up, said plug receiving means including a hollow cylindrical member having a plurality of openings throughout the surface thereof through which the broken pieces of earth may pass onto the top surface of the lawn to provide a top dressing, said breaking means including a cylindrical weight means mounted concentrically within said cylindrical member, the periphery of said weight means providing said surface adjacent the inner end of each plugger.

2. Aerating means according to claim 1 wherein said tubular pluggers have a cross-sectional area at the end thereof whereat the plugger penetrates the lawn which is less than the cross-sectional area of the plugger at the portion thereof adjacent said plug receiving means.

3. Aerating means according to claim 2 wherein said pluggers are tapered and conical.

4. Aerating means according to claim 1 wherein said pluggers are arranged in a plurality of rows and are spaced circumferentially around said cylindrical member to extend radially outwardly therefrom.

5. Aerating means according to claim 4 wherein said cylindrical weight means provides a substantial weight for insuring penetration of said pluggers into the lawn, and a pair of end plates closing the ends of said cylindrical member, said end plates being mounted for rotation within said cylindrical member.

6. Aerating means according to claim 5 including a pair of auxiliary weights and means for removably supporting said auxiliary weights outwardly of said cylindrical member.

7. Aerating means according to claim 6 including an axle means on which said cylindrical member is mounted, handle means extending from and connected to said axle means, said handle means having an extending portion, and wheel means mounted on said extending portion, said extending portion being constructed and arranged so that said wheel means is supportable above ground when said aerating means is moved along the ground with said cylindrical member supported on the ground and so that said aerating means may be moved along the ground with said wheel means in contact therewith and with said cylindrical member and said pluggers supported above the ground.

8. Aerating means according to claim 6 including three rows of pluggers, the outer rows of said pluggers having the ends thereof truncated angularly to form a spike-like member, and the middle row having squared off ends, the pluggers in each row being staggered circumferentially with respect to pluggers in an adjacent row.

9. Aerating means according to claim 5 wherein said end plates provide approximately 40 per cent of the weight necessary to force said pluggers into the ground under average conditions.

* * * * *